Jan. 22, 1946.    A. RINGER    2,393,567
STEREOSCOPIC PRINTER
Filed Oct. 5, 1943
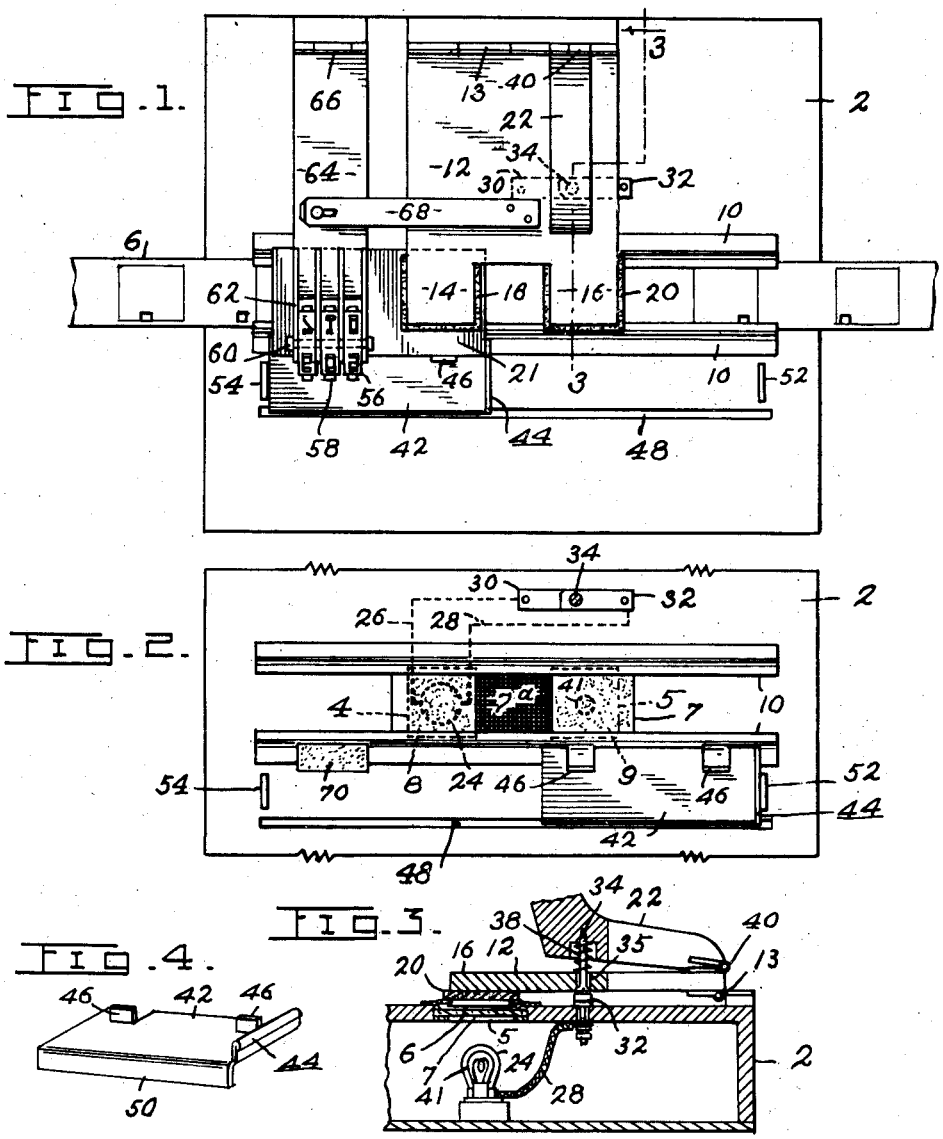
Inventor:
Arthur Ringer,
By F.G. Fischer,
Attorney.

Patented Jan. 22, 1946

2,393,567

UNITED STATES PATENT OFFICE 2,393,567

STEREOSCOPIC PRINTER

Arthur Ringer, Paola, Kans.

Application October 5, 1943, Serial No. 505,077

2 Claims. (Cl. 95—73)

My invention relates to stereoscopic printers for printing positive images upon cards, paper or other sensitized material, from negative films taken with a stereoscopic camera. Stereoscopic pictures printed in contact with a negative and viewed through a stereoscope produce a distorted effect as the negative image on the right hand side was focused by the left hand lenses and the negative on the left hand side was focused by the right hand lenses of the stereoscopic camera.

The principal object of my invention is the provision of a simple and inexpensive manually operated carriage whereby the sensitized material may be quickly and accurately brought into printing relation with a negative film, to print the right hand negative image on the left hand side of the sensitized material and print the left hand negative image on the right hand side of the sensitized material, so that when the print is viewed through a stereoscope the pictures printed thereon will resemble the original subject matter from which the negative was taken.

Another object is the provision of printing means for automatically marking each piece of sensitized material simultaneously with the printing of stereoscopic images.

Referring now to the accompanying drawing:

Fig. 1 is a plan view of the printer. Fig. 2 is a fragmentary plan view of the printer with some of the parts removed to show the carriage to better advantage. Fig. 3 is a cross section on line 3—3 of Fig. 1. Fig. 4 is a perspective view of the carriage.

Referring now in detail to the different parts, 2 designates a light-proof case having openings 4 and 5 in its top portion, spaced to coincide with images on a negative stereoscopic film 6 placed over the openings 4 and 5. The openings 4 and 5 are covered with a glass or other transparent plate 7, the middle portion 7a of which, between the openings 4 and 5, may be oqapue, so that if desired a single elongated opening may be formed in the top of the case instead of the two openings 4 and 5. The opaque center 7a prevents the passage of light and the clear spaces 8 and 9, at opposite sides of said opaque portion, may be sand blasted or otherwise treated, so that the light may pass therethrough without glare. The negative film 6 may be either placed directly over the transparent plate 7, or guided thereover by parallel guide means 10 fixed to the top of case 2 and extending along the opposite sides of the openings 4 and 5.

A platen 12 is connected at its rear end by a hinge 13 to the top of the case 2 and provided at its forward end with presser-feet 14 and 16 spaced to cover the openings 4 and 5 and the clear spaces 8 and 9, respectively. The undersides of the presser-feet 14 and 15 are provided with felt or other suitable cushioning material 18 and 20, respectively, to prevent damage to and provide even pressure upon sensitized material 21 when alternately placed in exposure position over the openings 4 and 5. A handle 22 is fixed upon the platen 12 to provide convenient means for raising and lowering the latter when the sensitized material is being placed in position over the openings 4 and 5, or being removed from such position after being printed.

A light to effect printing of the sensitized material is obtained by a light bulb 24 located in case 2 beneath the openings 4 and 5. The light bulb 24 is in an electric circuit comprising wire conductors 26 and 28 leading from a switch comprising elements 30 and 32, respectively, connected to a source of electricity, not shown. After the platen 12 has been lowered upon the sensitized material the pressure on the handle 22 is continued to force a stud 34 downward against the topmost switch element 30 to close the switch. The stud 34 extends downward through an aperture 35 in the platen and is encircled by a coil spring 38 interposed between the platen and the handle to normally hold the latter in raised position and permit the switch to open. The handle 22 is connected at its rear end to the top of the platen by a hinge 40, to permit limited up or down movement independently of the platen. The foregoing arrangement permits the platen 12 to be lowered upon the sensitized material 21, before the switch is closed.

A pilot light 41, which may be connected in any suitable manner, not shown, to the source of electricity, is provided to faintly illuminate the openings 4 and 5 and thus enable the operator to readily place the sensitized material and the negative in proper position over said openings, when working in a dark room.

Referring now to the carriage 42 which forms the most important feature of the present invention and is utilized for carrying the sensitized material 21 into proper printing position, said carriage is adapted to be slid to the right or left, Fig. 3, and may consist of any suitable material, but is preferably constructed of sheet metal bent upwardly at one end to form a handle 44 and provided adjacent to one of its longitudinal margins with upturned gages 46 to cooperate with the handle 44 in holding the sensitized material in proper position upon the carriage to be carried thereby into printing position.

The carriage 42 may be directed in its movements by any appropriate guide means, but in the present instance I have shown such means consisting of a guide slot 48 arranged in parallelism with the film guides 10. A longitudinal margin 50 of the carriage is bent downwardly to enter the guide slot 48 and retain the carriage in operative position. The sliding movement of the carriage 42 is limited by stops 52 and 54, respectively, fixed to the top of the case 2.

Another feature of the present invention resides in means for marking each piece of sensitized material 21 at the time it is printed. Said marking means consists of one or more disks 56 provided on their respective faces with appropriate symbols consisting in the present instance of raised numerals 58. The disks 56 are rotatably mounted upon a stationary shaft 60, secured in bearings 62 which frictionally restrain the disks from accidental rotation. The bearings 62 are fixed in the forward portion of an arm 64, operably connected at its rear end to the top of case 2 by means of a hinge 66, so that it may be raised and lowered with the platen 12 by a spring 68 yieldably connecting the arm to the platen.

An ink-pad 70 is fixed on top of the case 2 to provide means whereby the numerals 58 on the under portions of the marking disks 56 are simultaneously inked when lowered while the carriage is in contact with the stop 52. The ink-pad 70 is arranged in a recess in the top of the case 2, so that its upper surface will not be in the way of the carriage 42 when the latter is moved into engagement with the stop 54.

Briefly the operation is as follows: The carriage 42 is first moved into engagement with the stop 52, for convenience in placing the sensitized material 21 thereon, during which operation the platen 12 is lifted by the handle 22 and held in raised position while the carriage 42 and sensitized material 21 thereon are moved to the left, Fig. 1, until the carriage is checked by the stop 54. The foregoing operation brings the right-hand portion of the sensitized material 21 in printing position over the left-hand image in coincidence with the opening 4. The platen 12 is then lowered by the handle 22 to press the sensitized material against the film and to lower the marking disks 56 upon the sensitized material. Downward pressure on the handle 22 is continued until the member 34 closes the electric bulb circuit by pressing the switch element 30 against the companion element 32. Closing of the electric circuit causes the light bulb 24 to glow and effect printing of the negative image upon the sensitized material. When the platen is lowered and final pressure is applied to the handle 22 the spring 68 presses the disks 56 into contact with the sensitized material to mark the same. The platen 12 is then raised and the carriage 42 is moved to the right until checked by the stop 52. This brings the left side of the sensitized material 21 into printing position over the opening 5, with which the right-hand image is in coincidence, whereupon operation of the platen 12 and handle 22 as above described is repeated. When the platen 12 is lowered the printing disks 56 are lowered therewith and contact with the ink-pad 70 to re-ink the numerals on the under portion of the disks. When the carriage 42 is moved alternately as above described the sensitized material is held in position thereon by the handle 44, the gages 46 and the fingers of the operator.

Heretofore it has been customary to print the right and left negative images upon the respective right and left sides of the sensitized material, but this procedure produced a distorted effect when the pictures on the sensitized material were viewed through a stereoscope, because the right hand negative image was focused by the left hand lenses and the left hand negative image was focused by the right hand lenses of a stereoscopic camera. To overcome the distorted effect the printed sheet was cut into two parts so that the right and left hand pictures, respectively, could be transposed and mounted side by side upon a card to provide a stereograph that when viewed through a stereoscope the pictures would resemble the original subject matter from which the negative was taken.

By the use of my invention the pictures are transposed during the printing operation, thereby eliminating the necessity of cutting the print, transposing the pictures and mounting them upon a card.

Although a specific embodiment of the present invention has been illustrated and described, it is to be understood that various changes may be made without departing from the scope of the invention as claimed.

Having thus described my invention, what I claim and desire to secure by Letters Patent, is:

1. The combination with a stereoscopic printer including a case having right and left exposure openings, respectively, spaced to coincide with similar spaced pairs of images on a stereoscopic negative film, means for directing the film over the exposure openings, and means to effect printing of the images on sensitized material, of a nonperforate carriage arranged beside the exposure openings and adapted to be slid in reverse directions to carry the right and left sides of sensitized material over the left and right exposure openings, respectively, upturned gages on the carriage to insure proper positioning of the sensitized material thereon, one of said gages extending at right angles to the associated gages and adapted to act as a handle, and guide means for the carriage.

2. The combination with a stereoscopic printer including a case having right and left exposure openings, respectively, spaced to coincide with similarly spaced pairs of images on a stereoscopic negative film, means for directing the film over the exposure openings, and means to effect printing of the images on sensitized material, of a carriage arranged adjacent to one side of the exposure openings and adapted to be slid in reverse directions to carry the right and left sides of the sensitized material over the left and right exposure openings, respectively, a guide slot in the case spaced from and paralleling the exposure openings, a downturned marginal flange on the carriage extending freely into said slot, upturned gages on the carriage near one margin thereof, and a gage at one end of the carriage which also constitutes a handle, said gages being arranged to insure proper placement of the sensitized material upon the carriage.

ARTHUR RINGER.